US005111289A

United States Patent [19]

Lucas et al.

[11] Patent Number: 5,111,289

[45] Date of Patent: May 5, 1992

[54] VEHICULAR MOUNTED SURVEILLANCE AND RECORDING SYSTEM

[76] Inventors: Gary L. Lucas, 3701 Overcreek Rd., Columbia, S.C. 29206; Tracy E. Brewer, 685 Ayers Dr., Charleston, S.C. 29412

[21] Appl. No.: 515,104

[22] Filed: Apr. 27, 1990

[51] Int. Cl.5 ..................... H04N 7/18

[52] U.S. Cl. ..................... 358/108; 358/103; 358/125; 360/5

[58] Field of Search ..................... 358/108, 103, 125, 310, 358/229, 245, 248; 360/5; 346/107 VP; 445/346

[56] References Cited

U.S. PATENT DOCUMENTS

| | | | |
|---|---|---|---|
| 4,281,354 | 7/1981 | Conte | 360/5 |
| 4,396,942 | 8/1983 | Gates | 358/107 |
| 4,716,458 | 12/1987 | Heitzman | 358/103 |
| 4,789,904 | 12/1988 | Peterson | 358/310 |
| 4,815,757 | 3/1989 | Hamilton | 358/108 |
| 4,843,463 | 6/1989 | Michetti | 358/108 |
| 4,899,296 | 2/1990 | Khattak | 358/108 |
| 4,910,593 | 3/1990 | Weil | 358/93 |
| 4,949,186 | 8/1990 | Peterson | 358/108 |

OTHER PUBLICATIONS

Parade Magazine, Oct. 10, 1971, p. 15, Rogers.

*Primary Examiner*—Howard W. Britton
*Assistant Examiner*—Sherrie Hsia

[57] ABSTRACT

A vehicular surveillance system comprising a video recorder and monitor in a housing mounted within the passenger compartment of the vehicle to a bracket and a small camera rotatably mounted to the windshield of the vehicle. An FM microphone transmits audio signals to the vehicle's antenna whence it is carried to the recorder by a cable and added to the video images. Date and time information is superimposed on the video image on the top right of the image so as to interfere as little as possible with the image being recorded. The video recorder has a locking mechanism to prevent ejecting the video cassette by unauthorized personnel and its on/off switch is combined with the start record/stop recording function so that one button applies power to the system and starts the recording after a short delay. The housing may be removed from the vehicle for portable use in presenting recorded events as evidence and both video recorder and monitor may operate on the car battery or standard household current.

14 Claims, 3 Drawing Sheets

Fig. 1
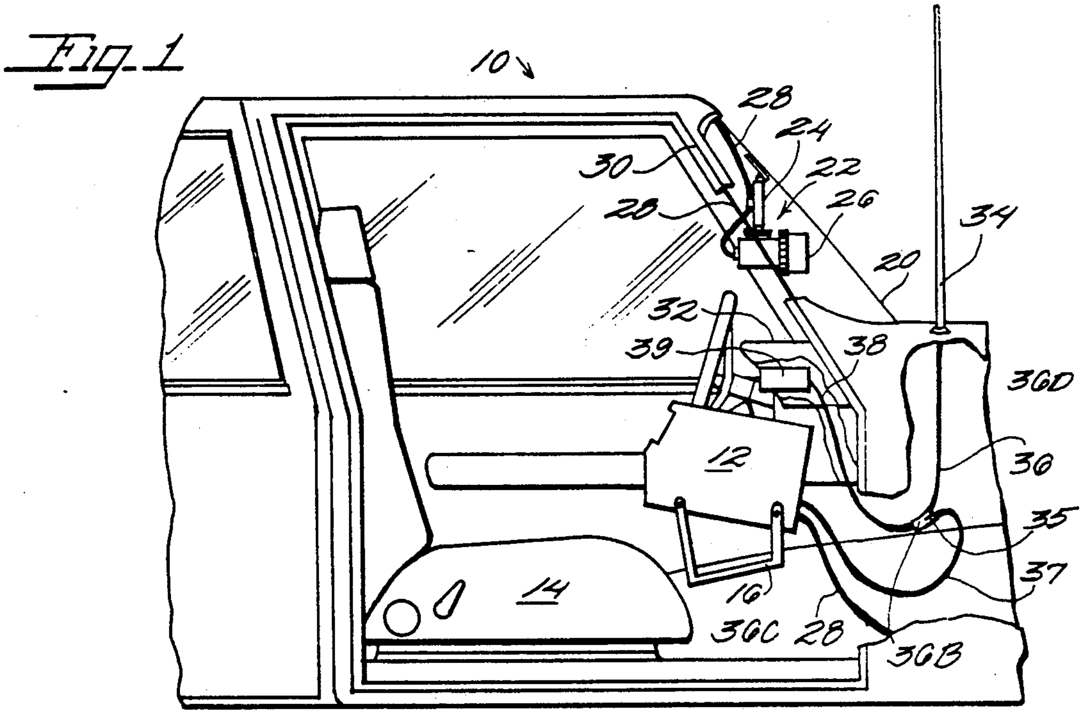
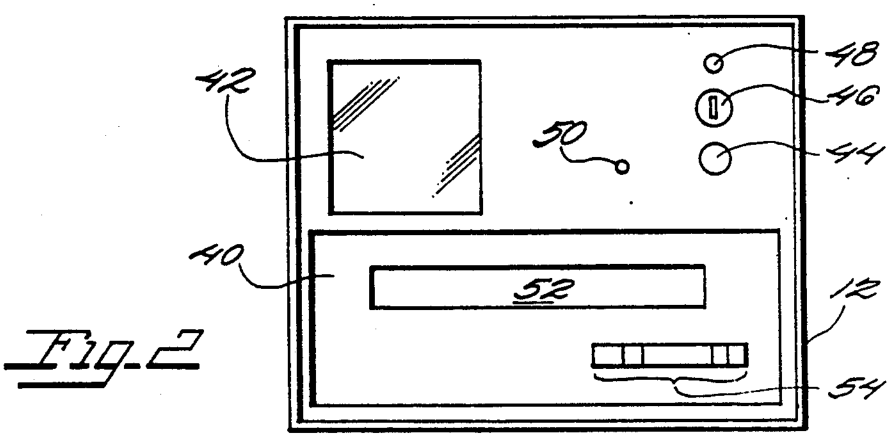
Fig. 2
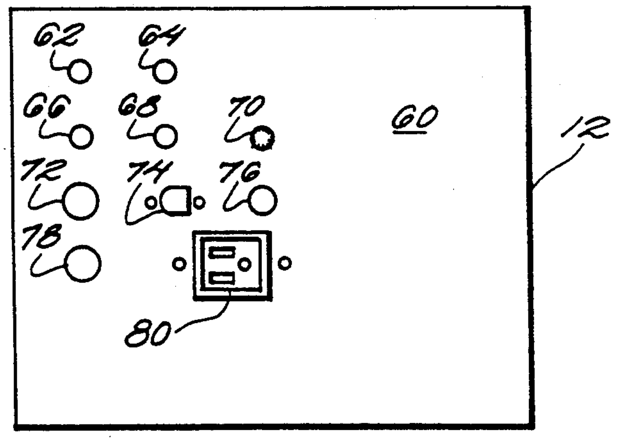
Fig. 3

VEHICULAR MOUNTED SURVEILLANCE AND RECORDING SYSTEM

BACKGROUND OF THE INVENTION

1. Field of the Invention

The present invention relates to vehicular-based surveillance systems. More particularly, the present invention relates to video and audio recording of events by a vehicular-based surveillance system.

2. Discussion of Background

Vehicular surveillance by video camera can augment police activities. A properly made video recording of an arrest and the circumstances preceding the arrest can add considerably to the credibility of the arresting officer's courtroom testimony as to the existence of probable cause for the arrest.

Vehicular-based surveillance systems for producing a recording of arrests are known. A description of the use of video cameras for documenting the arrest of traffic offenders in Creve Coeur, Mo., can be found in an Oct. 17, 1971 issue of Parade Magazine, for example. See also the system of Peterson described in U.S. Pat. No. 4,789,904. Others have developed systems for use by a motorist to provide his or her own record of events and for other private purposes, such as for providing proof of insurance claims. See the devices of Conte in U.S. Pat. No. 4,281,354 and of Michetti in U.S. Pat. No. 4,843,463.

Several considerations are important in the design of vehicular mounted surveillance systems. Since such systems are usually installed after purchase of the vehicles, it is important that the surveillance equipment be easily accommodated within the vehicle and not interfere with driving or interior features of the vehicle. The system needs to be compact, not only to minimize its space requirements but to be discrete and unobtrusive. The Peterson system, for example, uses a vault in the trunk. However, police carry a substantial amount of gear in the trunks of police cars. Furthermore, changing a tape requires stopping the vehicle and opening the trunk and vault. The surveillance system needs to be easy to use but flexible and practical enough to meet a variety of situations. Most importantly, the quality of evidence it presents will depend on how well its components function individually and as a unit and its ease of operation.

SUMMARY OF THE INVENTION

According to its major aspects, the present invention is a surveillance system for use in a vehicle. The surveillance system includes an auto-iris, video camera attached to the windshield of a car and sending video images to a video recorder within the passenger compartment. The recorder is located with a small monitor in a housing releasibly attached to a bracket attached to the floor of the vehicle by the driver's seat. A key-operated interlock on the recorder prevents the unauthorized removal of video cassettes from the recorder. As the video images are received from the camera, the date and time are superimposed in the upper right of the recorded images by a date and time generator. A frequency modulated, wireless microphone transmitter, worn preferably by the vehicle driver transmits sounds to the vehicle's antenna, which in turn are carried by cabling to the video recorder and incorporated with the video images on the cassette. A single switch turns the system on and activates the recorder. The recorder and monitor are adapted to be powered by the car battery or, alternatively, household current and can drive a television for showing the video cassette on a larger screen. Additionally, the system can be started remotely.

A feature of the present invention is the monitor and video recorder combined in a single housing in the passenger compartment of the vehicle. The passenger compartment is usually at a comfortable temperature year round so there is no need for a special climate controlled vault in, say, a trunk-located recorder. The housing with monitor and recorder is small and relatively light in weight so it occupies little space and can be carried easily. The driver can verify by viewing the monitor that the camera is aimed correctly to pick up the video images and can adjust the camera angle horizontally and vertically to make corrections as needed, but may turn the monitor off when not needed while allowing the recorder to continue to run. Furthermore, the housing can be removed from its bracket and for use in showing a video cassette recording of an arrest away from the vehicle when no appropriate recorder is available, such as in a rural magistrate's office. The system can be powered from the car battery or from standard household current and can drive a television with a full size screen for viewing of the video cassette by a large audience, such as a jury.

Another feature of the present invention is the superimposing of the date and time on the top right portion of the recorded image. Not only is the date and time information important as part of the recorded event, but the positioning of the information is also important. In its most common use, a police car equipped with the present surveillance system will be following a car that is speeding or being driven erratically. The police car will stop the vehicle from behind with the camera trained on the license plate at the bottom center of the recorded image and on the left side of the car, the side that the officer approaches. The top right is usually, then, the least important part of the image being recorded and the appropriate place for the date and time to be superimposed.

Yet another feature of the present invention is the use of the car's standard antenna to receive frequency modulated transmissions from the microphone. No special antenna is required. Therefore installation of the system is simplified and absence of a special antenna makes the system less conspicuous.

Still another feature of the present invention is the combination on/off switch and the start recording/stop recording switch. One button sends power to the system and starts the recording so that operation is simplified. A built-in timing circuit sequences power and record initiation so that the system begins recording only a few seconds after the power flows to it.

These and other features and advantages of the present invention will be apparent to those skilled in the art of vehicular-based surveillance systems from a review of the following detailed description of a preferred embodiment and the accompanying drawings.

BRIEF DESCRIPTION OF THE DRAWINGS

In the drawings:

FIG. 1 is a cut away, side view, of a portion of a vehicle with a preferred embodiment of the present invention shown therein;

FIG. 2 is a front view of the housing of the present invention;

FIG. 3 is a rear view of the housing of the present invention;

DETAILED DESCRIPTION OF A PREFERRED EMBODIMENT

Figure 4:
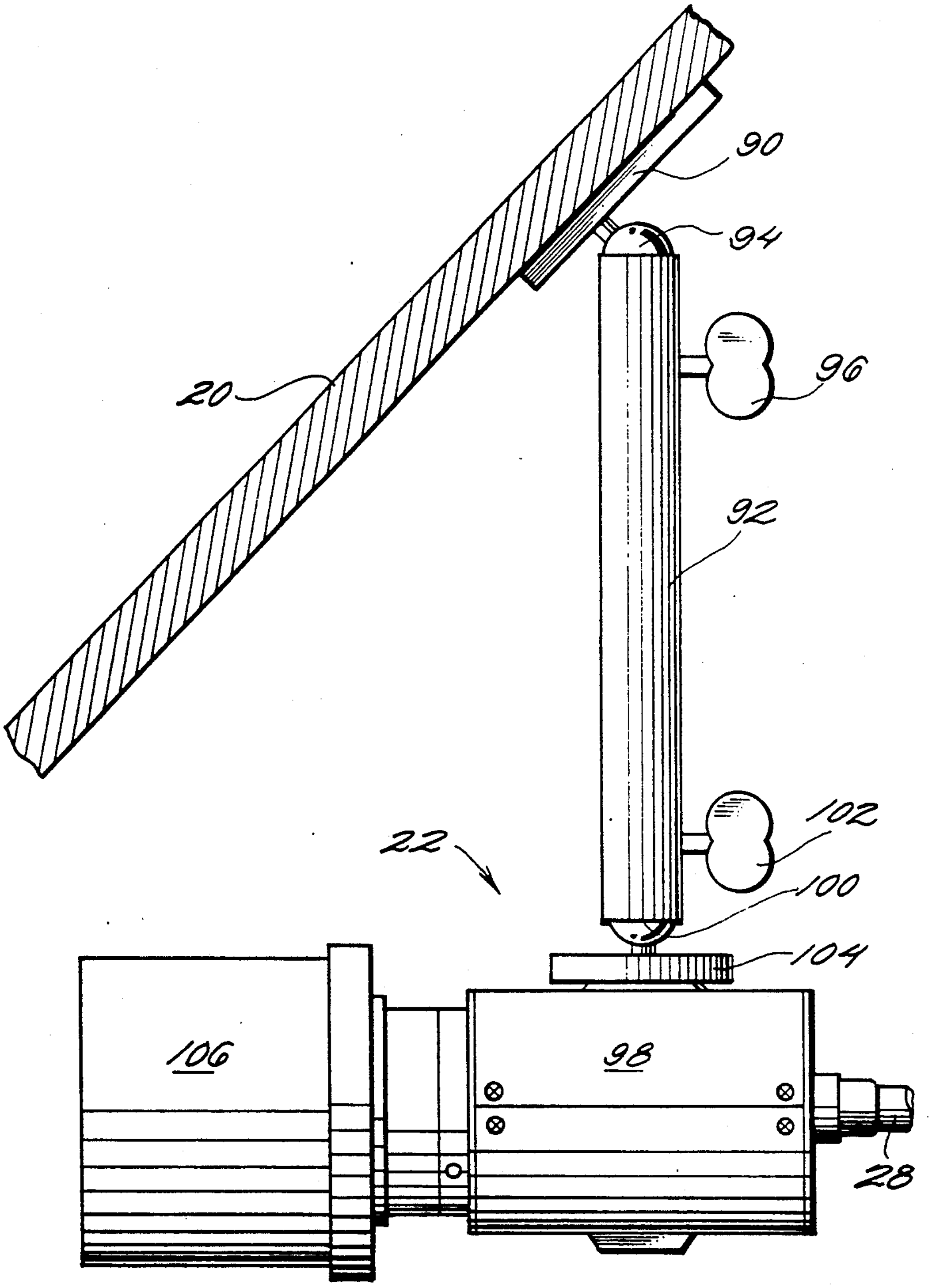
FIG. 4 is a detailed view of the camera of the present invention.

Now referring to FIG. 1, the present invention is shown in the front of the passenger compartment 11 of a motor vehicle 10. Vehicle 10 is partially cut away for clarity and shows a housing 12 positioned between the driver's seat 14 and the front passenger seat (not shown) and preferably angled toward driver's seat 14. Housing 12 is detachably mounted to a floor bracket 16 so that housing 12 may be detached and removed from vehicle 10 with relative ease. Preferably a padlock (not shown) prevents housing 12 from being removed by unauthorized personnel.

To the inside of a windshield 20, approximately centered and towards the top of windshield 20 is a camera 22 mounted on a bracket 24 having a lens 26 and a cable 28. Through cable 28 is carried video images from camera 22 to housing 12. Cable 28 preferably is run across the top of windshield 20, down through the frame 30 of window 20, behind and under the dashboard 32 of vehicle 10 to housing 12. An existing, standard car antenna 34 is attached to an antenna splitter 35 with a cable 36. A second cable 37 connects antenna splitter 35 to housing 12. A third cable 38 connects antenna splitter 35 to car radio 39. Antenna 34 can receive signals for radio 39 or direct them to housing 12.

In FIG. 2 is shown a preferred embodiment of the front of housing 12 which has a video recorder 40 and a monitor 42, and a combination ON/OFF button 44 for both switching the power on and off and the recorder on and off, a monitor ON/OFF button 48 and a POWER ON light emitting diode (LED) 50 to indicate that power is on although monitor 42 might be off. An information storage unit such as a video cassette is inserted in the front of video recorder 40 in a slot 52. Preferably video recorder 40 records on 8 millimeter cassettes or smaller information storage units rather than larger storage units such as VHS or BETA in order to reduce the space required for the recorder. Video recorder 40 is otherwise a standard recorder that pulls in the cassette and drops it into position for recording or playing and has a standard set of controls 54 of a standard video recorder including an eject button, pause, rewind, and so on. As with other video recorders, a remote control unit (not shown) may be provided to operate the recorder at a distance, which can prove useful when an officer has left the vehicle, is still in the range of the remote control unit and desires to activate the recorder. Also, in a court room, where housing 12 has been brought, an attorney can conveniently activate and deactivate recorder 40 remotely.

A lock 46, preferably operated by a key 58, normally removed from housing but illustrated in lock 46, is provided to prevent removal of the video cassette from recorder 40. Lock 46 disables the operation of the eject button of recorder 40.

Monitor 42 is also preferably small in order to take up as little space as necessary, preferably having a screen somewhat larger than approximately 2 inches (5 centimeters) but less than approximately 9 inches (23 centimeters), and most preferably approximately 4 inches (10 centimeters) for ease in viewing by the driver who is sitting next to housing 12 but would have difficulty seeing images while driving if monitor 42 were too small.

FIG. 3 shows the back 60 of housing 12 with various connections including connections for video output 62, audio output 64, camera input 66 from camera cable 28, antenna input 68 from antenna cable 37, audio volume control 70, DC voltage input connection 72 from the battery of vehicle 10, connection 74 for DC power to camera 22 through camera cable 28, a radio frequency output jack 76 for connection to the antenna of a standard television, a fuse 78, and a connection 80 for standard AC power.

FIG. 4 shows camera 22 in more detain than shown in FIG. 1, and its attachment to windshield 20. A base 90 is attached by gluing or other attaching means to windshield 20. Base 90 is connected to a camera-holding stem 92 by a pivoting joint 94 such as a ball and socket as shown. Although pivoting, it is important to be able secure stem 92 to base 90 rigidly by a tightening means such as a first wing nut 96.

A similar pivotable attachment connects the other end of stem 92 to camera 22, which attachment includes a ball joint 100 and a second wing nut 102 for tightening. A knurled wheel 104 allows panning of camera 22 in a horizontal plane. Camera 22 comprises a small, solid state, preferably charge coupled device 98 able to secure an image at low light and preferably rated at half lux or lower, and an automatically controlled iris lens 106 so that the amount of light entering camera 22 can be automatically adjusted for correct exposure. Cable 28 is connected to camera 22 and to camera input 66 and connection 74 on the back of housing 12.

Figure 5:
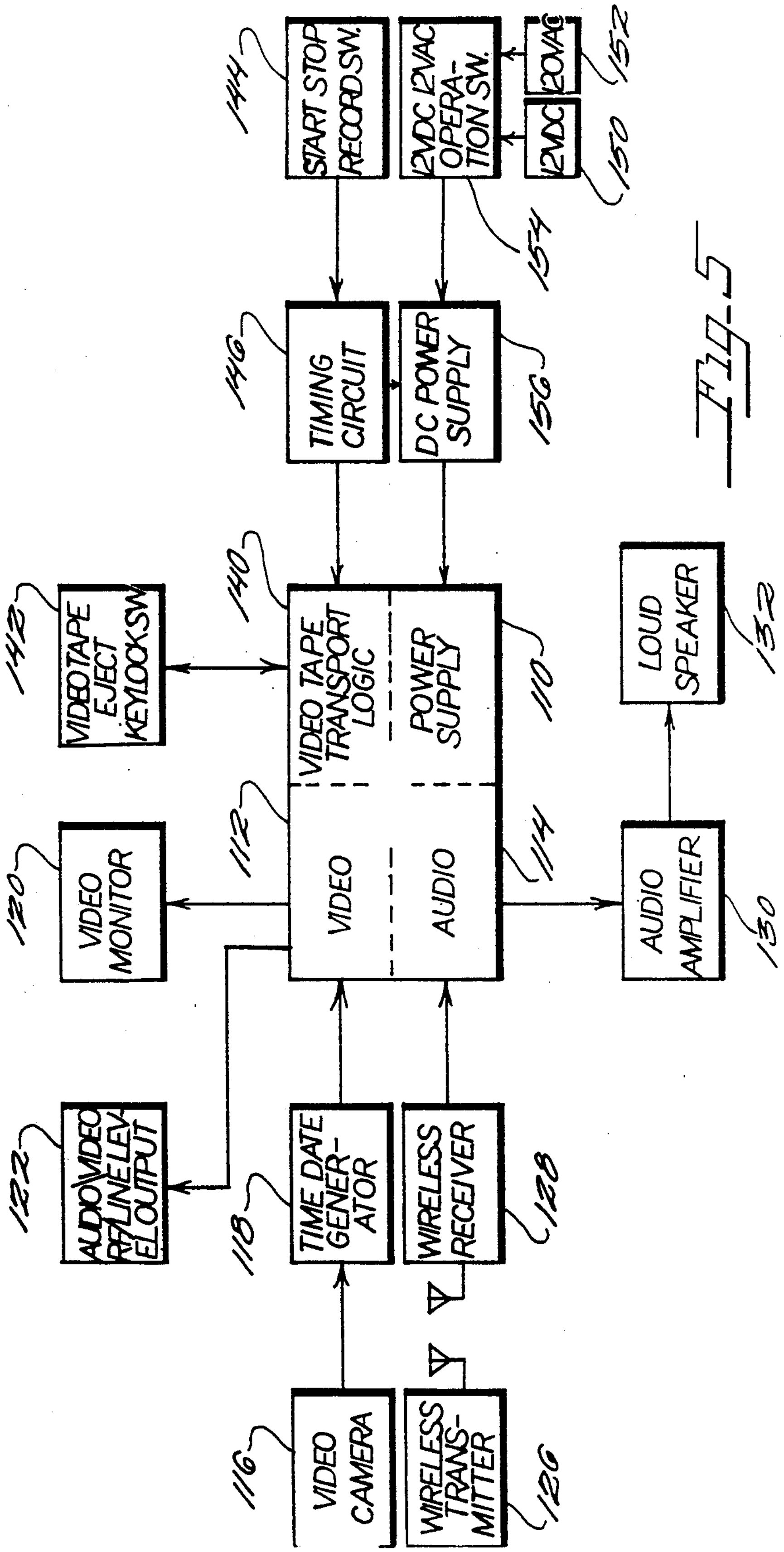
FIG. 5 is a block diagram of a surveillance system according to the present invention.

FIG. 5 is a block diagram showing the relation of the various components of the surveillance system of the present invention. The center of the system is the video recorder 110 which includes a video component 112 and an audio component 114 each receiving input from separate sources and combining them to produce a video and audio recording on an information storage unit, preferably an 8 millimeter cassette, which cassette is not part of the present invention. The video image is generated by video camera 116 and sent to a date time generator 118. Date/time generator 118 superimposes the data and time in digital format on the top right portion of the received image so as to interfere as little as possible with the information contained in the image. The image would normally contain a view of license plate and the a stopped vehicle, the activity of the officer as he approaches the vehicle on the left, and any testing of the individual's condition (reflexes, ability to walk, etc.) which would usually be done on the left side of the stopped vehicle. Regardless of any rewinding, pausing, erasing, rerecording or other editing, date/-time generator 118 would place the date and time on the image as it is recorded so that the sequence of images could be seen in the recording and any images not in sequence detected. The purpose of date/time generator 118 is to add both useful information and credibility to the recorded images.

Video output is to monitor 120 or alternatively to an audio/video radio frequency line level output 122 for connection to a standard television antenna if it is desired to show the video cassette on a standard television having a larger screen.

The input to the audio component 114 comes from a frequency modulated, wireless transmitter 126, preferably a small microphone clippable to a collar or shirt pocket, transmitting to a wireless receiver 128, preferably antenna 34 of vehicle 10 which is connected by cable 36 to antenna splitter 35 to cable 37 (FIGS. 1 and 3). The output of audio component 114 is to an audio amplifier 130 and thence to a loudspeaker 132, both of which are located in housing 12.

Video recorder 42 has video tape transport logic component 140 for winding the cassette spools and moving the cassette into and out of position. The cassette eject function of transport logic 140 is enabled or disabled by the position of lock 56 through video tape eject keylock switch 142.

On the right of FIG. 5 is the combination of power on/power off and start recording/stop recording switch 144 which feeds into a timing circuit 146. Timing circuit 146 controls the startup of the surveillance system by sequentially supplying 12 volts to the system, then switching on the power to the system and then, after a fraction of a second, switching on the recorder. The appropriate delays can be achieved using relays or high voltage, open collector output transistor circuits to pull the input to ground when activated. In turning the surveillance system off, the order of events is simply reversed but with a slightly longer delay, preferably approximately a second or longer, to rewind the video tape into the cassette, which can be achieved, for example, using a relay capable of holding an electromagnetic field a short time after power is switched off. Combining the power on/off control with the start/stop recording control into one button makes activating the surveillance system easier and quicker, which may be especially important in emergencies or at night; providing timing circuit 146 assures that the components go on and off in correct sequence and with the appropriate delay between each event.

Power is supplied by either a 12 volt DC source 150 such as the car battery or from a 120 volt AC source 152 such as ordinary household current selected by a voltage operation switch 154 and fed into a DC power supply 156 which regulates the input source of power selected. Although automobile battery power would be preferred for normal use of the present system, the flexibility of operating the system from normal household current is highly desirable since housing 12 can be removed from bracket 16 and carried into a magistrate's court, for example, to show a recording on an 8 millimeter videotape.

In use, a police officer driving vehicle 10 could have recorder 40 operating continuously with the monitor 42 turned on or off (FIGS. 1 and 2) or could switch recorder 40 on by pressing ON/OFF button 44 when needed to record an unusual event. If camera 22 were not directed properly, horizontal adjustments can be made by turning knurled wheel 104 (FIG. 4). Camera 22 can be easily positioned in a generally appropriate attitude by loosening first and second wing nuts 96 and 102 and pivoting camera 22 into a desired position with respect to windshield 20, then tightening wing nuts 96 and 102 until camera 22 remains securely in place but can be moved vertically, if necessary. It has been found best to initially aim camera 22 so that the center of the hood of vehicle 10 is at the bottom center of the image on monitor 42. A simple check of the monitor with monitor ON button 48 pressed will indicate whether the image is being recorded properly and if camera 22 is aimed properly.

It will be apparent from the foregoing description that many changes can be made in the preferred embodiment without departing from the spirit and scope of the invention, which is defined by the following claims.

What is claimed is:

1. In a vehicle having a passenger compartment and a standard radio antenna, said vehicle having a source of electrical power, a surveillance system comprising:

camera means for obtaining motion picture images, said camera means attached to said vehicle;

a bracket attached to said vehicle within said passenger compartment;

a housing releasably attached to said bracket;

means for recording said images onto removable information storage units within said housing;

means for monitoring said images as said images are being recorded or monitoring said information storage units, said monitoring means located within said housing; and a switch carried by said housing and in electrical communication with said source of power, said switch activating said monitoring means, said camera means and said recording means, said switch activating said recording means after said switch activates monitoring and said camera means are activated.

2. The system as recited in claim 1, further comprising means for superimposing date and time information on said images so that said date and time information will appear in the upper right corner of said image.

3. The system as recited in claim 1, further comprising means for preventing said information storage units from being removed from said housing.

4. The system as recited in claim 1, further comprising:

means for transmitting an audio signal to said radio antenna; and means for imposing said audio signal received by said radio antenna onto said information storage units to correspond with said images.

5. The system as recited in claim 1, further comprising:

means for superimposing date and time information on said image;

means for imposing an audio signal onto said information storage units to correspond with said images.

6. The system as recited in claim 1, further comprising:

means for preventing said information storage units from being removed from said housing; and means for superimposing date and time information on said images.

7. In a vehicle having a passenger compartment and a standard radio antenna and a source of electrical power, a surveillance system comprising:

camera means for obtaining motion picture images, said camera means attached to said vehicle;

a bracket attached to said vehicle within said passenger compartment;

a housing releasably attached to said bracket;

means for recording said images onto removable information storage units within said housing;

means for monitoring said images as said images are being recorded or monitoring said information storage units, said monitoring means located within said housing;

means for preventing said information storage units from being removed from said housing;

means for transmitting an audio signal to said radio antenna;

means for carrying said audio signals received by said radio antenna and imposing said audio signal onto said information storage units to correspond with said images;

means for superimposing date and time information on said image so that said date and time information will appear in the upper right corner of said image; and switching means for applying said electrical power to said system and activating said camera means, said monitoring means and said recording means, said switching means having circuitry means for delaying activation of said recording means until after said electrical power source is applied to said camera means and said monitoring means.

8. The system as recited in claim 7, wherein said camera means further comprises a camera having a lens with an iris responding automatically to changes in the amount of ambient light.

9. The system as recited in claim 7, wherein said camera means further comprises a camera rated at half lux or lower.

10. The system as recited in claim 8, wherein said camera means further comprises a camera rated at half lux or lower.

11. The system as recited in claim 7, wherein said monitoring means further comprises a switch so that said monitor may be turned off when said recording means is recording.

12. The system as recited in claim 7, wherein said monitoring and said recording means is operated off a source of household current.

13. The system as recited in claim 7, wherein said recording means is a video recorder having a means for ejecting said information storing units and said preventing means inhibits said ejecting means from ejecting said information storing units from said housing.

14. The system as recited in claim 7, wherein said switching means having circuitry means for delaying activation of said recording means until after said electrical power source is applied to said system.

* * * * *